United States Patent [19]

Blasius, Jr.

[11] Patent Number: 4,990,565
[45] Date of Patent: Feb. 5, 1991

[54] TRANSPARENT POLYBLENDS

[75] Inventor: William G. Blasius, Jr., North Haven, Conn.

[73] Assignee: Polysar Financial Services S.A., Fribourg, Switzerland

[21] Appl. No.: 397,395

[22] Filed: Aug. 23, 1989

[51] Int. Cl.$^5$ .................. C08L 53/02; C08L 51/04
[52] U.S. Cl. .................................... 525/71; 525/84
[58] Field of Search ............................ 525/71, 84

[56] References Cited

U.S. PATENT DOCUMENTS

| | | | |
|---|---|---|---|
| 2,755,270 | 7/1956 | Hayes | 525/87 |
| 3,300,545 | 1/1967 | Baer | 525/84 |
| 4,772,667 | 9/1988 | Biletch et al. | 525/310 |

Primary Examiner—John C. Bleutge
Assistant Examiner—David Buttner
Attorney, Agent, or Firm—Stevens, Davis, Miller & Mosher

[57] ABSTRACT

A polyblend of a copolymer of an alkyl (meth)acrylate and a vinyl aromatic grafted on to a low molecular weight conjugated diolefin polymer with a terpolymer of a vinyl aromatic, an alkyl acrylate, and an alkyl methacrylate grafted on to a di- or tri-block polymer of vinyl aromatic monomers and a conjugated diolefins in a weight ratio from 10:90 to 40:60 have good flow rates and impact resistance.

12 Claims, No Drawings

TRANSPARENT POLYBLENDS

FIELD OF THE INVENTION

The present invention relates to polyblends which have a good combination of physical properties including melt flow rate (cond. I g/10 min.); notched Izod impact, tensile elongation, and a reasonable deformation temperature underload.

DESCRIPTION OF THE PRIOR ART

The prior art teaches various graft polymers. U.S. Pat. No. 4,772,667 issued Sept. 20, 1988 in the name of Polysar Financial Services S.A. discloses an impact modified terpolymer. The terpolymer comprises a polymer of 25-75 parts by weight of styrene., 7-30 parts by weight of butyl acrylate and 2-50 parts by weight of methyl methacrylate polymerized in the presence of a styrene-butadiene (S-B) di or styrene-butadiene-styrene (S-B-S) triblock polymer. The patent does not suggest that such polymers may be used in blends.

U.S. Pat. No. 3,300,545 issued Jan. 24, 1967 to Dow teaches a blend of polymers comprising a rigid thermoplastic, and a graft copolymer formed by grafting 25-100 parts by weight of a mixture of a monovinyl aromatic monomer and a lower alkyl acrylate to 100 parts by weight of a diene rubber. The graft copolymer in accordance with the present invention contains significantly lower amounts of rubber than the graft copolymer of U.S. Pat. No. 3,300,545. Additionally, the rubber used in the graft copolymer in accordance with the present invention is a low molecular weight rubber, which is not disclosed in U.S. Pat. No. 3,300,545.

U.S Pat. Nos. 2,755,270 issued July 17, 1956 teaches tertiary blends of polymers comprising polystyrene, a graft copolymer, and a butadiene copolymer. The present invention does not contemplate such tertiary blends. U.S. Pat. No. 2,755,270 teaches that the graft polymer should comprise styrene and butadiene with not more than 10 percent of a third monomer. The graft copolymers in accordance with the present invention are significantly outside the teaching of U.S. 2,755,270.

The present invention seeks to provide novel polyblends having a good balance of properties, particularly Izod impact strength and melt flow rate. Accordingly, the present invention provides novel polymeric blends having a high impact resistance, and a high melt flow while retaining other properties of the blend. The blends of the present invention may be translucent but preferably are transparent.

SUMMARY OF THE INVENTION

The present invention provides a polymer blend comprising:
(A) from 10 to 40 parts by weight of a graft copolymer formed by the free radical polymerization of a monomer mixture comprising:
  (i) from 45 to 70 weight percent of one or more $C_{1-2}$ alkyl, acrylates, methacrylates or a mixture thereof.
  (ii) from 25 to 50 weight percent of one or more $C_{8-12}$ vinyl aromatic monomers which are unsubstituted or substituted by a $C_{1-4}$ alkyl radical or a chlorine atom; in the presence of
  (iii) from 5 to 30 weight percent of a polymer of one or more $C_{4-6}$ conjugated diolefins, said polymer having a molecular weight of from 20,000 to 150,00, and
  (iv) either (a) from 0.05 to 0.15 weight percent of a chain transfer agent if initiator is present in an amount of less than 1.0 parts by weight per 100 parts of monomer and conjugated diolefin; or (b) the absence of a chain transfer agent if initiator is present in an amount of at least 1.0 parts by weight per 100 parts of monomer; and
(B) from 90 to 60 parts by weight of a graft terpolymer formed by the polymerization of a monomer mixture comprising:
  (i) from 25 to 75 weight percent of one or more $C_{8-12}$, vinyl aromatic monomers which are unsubstituted or substituted by a $C_{1-4}$ alkyl radical or a chlorine atom;
  (ii) from 10 to 50 weight percent of one or more methacrylate esters which form homopolymers having a Tg greater than 40° C.;
  (iii) from 7 to 30 weight percent of one or more acrylate esters which form homopolymers having a Tg less than 35° C., in the presence of:
  (iv) from 2 to 20 weight percent of a di- or tri- block copolymer of the formula C-D or C-D-C wherein C is a homopolymer block of a $C_{8-12}$ vinyl aromatic monomer which is unsubstituted or substituted by a $C_{1-4}$ alkyl radical or a chlorine atom; and D is a homopolymer block of a $C_{4-6}$ conjugated diolefin which is unsubstituted or substituted by a chlorine atom; said block copolymer having a molecular weight of at least 75,000.

DETAILED DESCRIPTION OF THE INVENTION

The present invention comprises a blend of a graft copolymer and a graft terpolymer in a 10:90 to 40:60, preferably 15:85 to 35:65 weight ratio.

The graft copolymer (or component (A) comprises from 45 to 70, preferably 50 to 55 weight percent of one or more $C_{1-2}$ alkyl acrylates, methacrylates, or a mixture thereof and from 30 to 45, preferably 25 to 50 weight percent of one or more $C_{8-12}$ vinyl aromatic monomers, which are grafted onto from 5 to 30, preferably 5 to 10 weight percent of a low molecular weight polymer of a $C_{4-6}$ conjugated diolefin.

Useful $C_{1-2}$ alkyl acrylates and methacrylates comprise methyl methacrylate, ethyl methacrylate, methyl acrylate and ethyl acrylate. A preferred methacrylate is methyl methacrylate.

Vinyl aromatic monomers include $C_{8-12}$ vinyl aromatic monomers which are unsubstituted or substituted by a $C_{1-4}$ alkyl radical or a chlorine atom. Some vinyl aromatic monomers include styrene, alpha methyl styrene, and t-butyl styrene.

The $C_{4-6}$ conjugated diolefin polymers have a molecular weight (MW) of less than 150,000, preferably from 30,000 to 50,000. The polymer may be a liquid polymer. Useful conjugated diolefins include butadiene, isoprene, and chloroprene. Polyisoprene is a preferred conjugated diolefin polymer substrate for the graft polymer.

In preparing the graft copolymer the ratio of the comonomers is selected so that the refractive index of the graft copolymer is comparable to that of the graft terpolymer (e.g. component B). Preferably the refractive index of the graft copolymer (e.g. component A) is within ±0.01, most preferably ±0.005 of the refractive index of the graft terpolymer (component B).

The ratio of the comonomers in the graft copolymer may be estimated using, for example the formula in the Polymer Handbook 2nd Ed. John Wiley and Sons Inc. to calculate the refractive index of a copolymer. If the refractive index of the graft copolymer is selected to match that of the graft terpolymer and the refractive index of the monomers is taken from the tables, then the weight faction of each monomer can be calculated.

The graft copolymer is prepared using a free radical polymerization. The graft copolymer may be prepared using a suspension process. The low molecular weight polymer of a conjugated $C_{4-6}$ diolefin is dissolved in (or if a liquid blended with) the $C_{1-2}$ alkyl, acrylate, methacrylate or a mixture thereof and vinyl aromatic monomers Then initiator(s) and optionally a chain transfer agent are added to the mixture. The initiator may be used in amounts from 0.5 to 2 parts by weight per 100 parts by weight of the mixture of monomers and diolefin polymer. If used in amounts greater than about 1 part by weight per 100 parts by weight of the mixture of monomers and diolefin polymer a chain transfer agent need not be added to the mixture. Preferably the initiator is a mixed initiator comprising 0.2 to 1, preferably about 0.7 parts by weight of an aromatic peroxide such as benzoyl peroxide and 0.2 to 1, preferably about 0.7 parts by weight of a peroxide of a $C_{8-12}$ alkanoic acid such as lauryl peroxide. If the total initiator is used in amounts of less than 1 part by weight per 100 parts by weight of monomers and conjugated diolefin polymer then a chain transfer agent should be incorporated into the mixture in an amount from about 0.03 to 0.8, preferably about 0.2 parts by weight per 100 parts by weight of monomers and conjugated diolefin polymer. Some chain transfer agents are $C_{8-15}$ alkyl mercaptans, such as dodecyl mercaptan.

Generally, in suspension polymerization, the solution of low molecular weight $C_{4-6}$ conjugated diolefin polymer in the alkyl acrylate, methacrylate or mixture thereof and styrene monomer mixture may be dispersed in water in a weight ratio of 30 to 50 parts by weight of monomers and dissolved conjugated $C_{4-6}$ diolefin per 100 parts by weight of water. The solution is dispersed in the water using small amounts, typically from 0.02 to 0.50 parts by weight of dispersing agent per 100 parts by weight of the solution of $C_{4-6}$ conjugated diolefin in monomers. Suitable dispersing agents include polyacrylic acid and the like. The initiator is added to the system and the mixture is heated to initiate polymerization. Typically the mixture may be heated to from 80° to about 100° C., preferably about 85° to 95° C. The polymerization is run to as high a conversion as possible, preferably in excess of 99 percent conversion. This may take from 3 to 4 or more hours depending on the size of the reactor and the reaction temperature. The resulting product is a slurry of fine beads. The product is separated from the aqueous phase by suitable means, such as filtration or centrifuging.

In the alternative, the graft copolymer may be prepared using a bulk free radical polymerization process. As in the suspension process, the low molecular weight $C_{4-6}$ conjugated diolefin is dissolved in the mixture of the $C_{1-2}$ acrylate, methacrylate or a mixture thereof and $C_{8-12}$ vinyl aromatic monomer. Preferably the $C_{4-6}$ conjugated diolefin monomer is first dissolved in the $C_{8-12}$ vinyl aromatic monomer(s) as in a conventional high impact polystyrene process (HIPS). Then the solution of polydiene in aromatic monomer is diluted with the (meth)acrylate monomers.

The resulting reaction mixture is fed to a jacketed reactor with the required initiator(s) and where necessary the chain transfer agent in the amounts specified above. The reaction is conducted at similar temperatures. The polymer may then be devolatilized, extruded and chopped into pellets. Alternately, the polymerizing reaction mixture may be fed to a plate and frame press where the polymerization is driven to completion and the resulting products crushed and granulated.

In the above process, small amounts, not more than about 25, preferably less than 15 weight percent of a diluent may be incorporated into the reaction mixture to help reduce viscosity and better control the reaction.

It may, in some cases, be desirable to dry the resulting product in a hot air dryer prior to blending with the graft terpolymer.

The graft terpolymer may be prepared by a suspension or by a bulk process The particulars of the polymerization of the graft terpolymer are disclosed in U.S. Pat. No. 4,680,337 issued July 14, 1987 to Polysar Financial Services S.A., the text of which is hereby incorporated by reference.

The graft terpolymer comprises a graft of 100 parts of a monomeric mixture comprising:
 (i) from about 25 to 75 preferably about 35 to 45 weight percent of a $C_{8-12}$ vinyl aromatic monomer which is unsubstituted or substituted by a $C_{1-4}$ alkyl radical or a chlorine or bromine atom;
 (ii) from about 7 to 30, preferably 7 to 15 weight percent of an acrylate ester which forms a homopolymer having a Tg less than 35° C.;
 (iii) from 10 to 50, preferably from 35 to 45 weight percent of a methacrylate ester which forms a homopolymer having a Tg greater than 40° C. grafted to from 2 to 20 weight percent of a di- or tri-block polymer of the formula C-D or C-D-C where C is a homopolymer block of a $C_{8-12}$ aromatic monomer which is unsubstituted or substituted by a $C_{1-4}$ alkyl radical or a chlorine atom and D is a homopolymer block of a $C_{4-6}$ conjugated diolefin which is unsubstituted or substituted by a chlorine atom; said block copolymer having a molecular weight of at least 75,000 preferably from 150,000 to about 300,000 most preferably from 175,000 to 275,000.

Suitable $C_{8-12}$ vinyl aromatic monomers and $C_{4-6}$ conjugated diolefin monomers have been discussed above.

Acrylate esters which may be used to make the graft terpolymer are those which form homopolymers having a Tg of less than 35° C., preferably less than 0° C. such as ethyl acrylate, propyl acrylate, butyl acrylate and mixtures thereof.

Methacrylate esters which may be used to make the graft terpolymer are those which form homopolymers having a Tg greater than 40° C. such as methyl methacrylate, ethyl methacrylate and mixtures thereof.

Generally the di- or tri-block polymer is dispersed in the monomer mixture Preferably the di- or tri-block polymer is dispersed or dissolved in the vinyl aromatic monomer, which is then diluted with the acrylate and methacrylate monomers. Optionally a small amount, less than 25, preferably less than 15 weight percent of a diluent may be added to the resulting mixture. The monomer mixture, initiator and chain transfer are fed to a reactor and heated to initiate polymerization (e.g. at about 80° to 100° C.) for 3 to 6 hours. In the bulk process, the reaction mixture then passes through a series of subsequent zones or reactors at increasing temperatures (e.g. Zone 1-105°-120° C., Zone 2 125°-150° C.). The polymerization is driven to a high conversion then the polymer melt is heated in a preheater at about 220 to 240° C., then devolatilized at a temperature of about 230°-250° C. The devolatilized melt is then extruded as strands, cooled and chopped to length.

In the bulk-suspension process, rather than being fed to successive reactors or reaction zones, the partially polymerized mixture is dispersed in water and reacted at from 75 to 90° C. for up to 7 hours. The resulting product is separated from the water by suitable means (filter, centrifuged, etc.) and optionally dried.

The obtained graft copolymer is then blended with the graft terpolymer in a suitable procedure such as a tumble blender. The blend is then fed through an extruder. The extruder may be a single screw extruder or a twin screw extruder. Preferably the extruder is operated using a mixing screw. This avoids having to pass the blend through the extruder twice which may degrade some of the polymer. The extruder may be operated at temperatures from 350° to 400° F.

The extruded strands are cooled, typically by passing them through a cooling bath of water and then chopped to appropriate length, typically about ⅛ of an inch.

The graft copolymers may also be solution blended. The polymers may be dissolved in one or more suitable solvent(s). The solutions are then blended and the solvent(s) are then evaporated. The resulting polymer blend may then be granulated, if required.

The present invention will be illustrated by the following examples in which parts are by weight (e.g. lb.) unless otherwise indicated.

EXAMPLE I

A graft copolymer was prepared as follows. Eight (8) parts of polyisoprene having a molecular weight of about 40,000 was dissolved in a monomer mixture comprising 53.0 parts by weight of methyl methacrylate and 38.4 parts by weight of styrene. To the mixture was added 0.1 parts by weight of tertiary dodecyl mercaptan and 0.5 parts by weight of benzoyl peroxide. The mixture was dispersed in 200 parts of water using 0.7 parts of polyacrylic acid. The resulting mixture was heated to 85° C. and held at that temperature for 4 hours to obtain essentially 100% conversion. The resulting slurry product was filtered and dried, in a hot air circulating oven.

The resulting graft copolymer was tumble blended with a graft terpolymer in a 60:40 graft terpolymer graft copolymer weight ratio.

The graft terpolymer comprised a terpolymer of styrene, butyl acrylate and methyl methacrylate grafted onto a styrene butadiene styrene block terpolymer having a styrene content of about 31% and a molecular weight of about 113,000 in a weight ratio of 55:17:23:5 (S:BuA:MMA:Block Copolymer). The blend was then extruded through a single screw extruder equipped with a mixing screw. The extruder was operated at 400° F. (about 205° C.) and at 100 R.P.M.'s. The extrudate was cooled in a water bath and chopped into pellets. The resulting pellets were molded into test samples and tested for Melt Flow (Cond. I, g/10 min.), Notched Izod Impact, Tensile Strength, Tensile Elongation, Tensile Modulus, and Distortion temperature under Load (DTUL). As comparison similar tests were carried out on the graft terpolymer and the graft copolymer per se. The results are set forth in Table I.

TABLE I

| Test | ASTM Test procedure | Graft Terpolymer | Graft Terpolymer/ Copolymer 60:40 | Graft Copolymer |
|---|---|---|---|---|
| Melt Flow Cond I g/10 min. | D1238 | 3.12 | 4.20 | 4.10 |
| Notched Izod Impact ⅛", ft lbs/in | D265A | 2.03 | 2.56 | 0.43 |
| Tensile Strength at Yield PSI | D638 | 5608 | 6729 | 8667 |
| Tensile Elongation at break (%) | D638 | 55.3 | 78.8 | 12.4 |
| Tensile Modulus 4.53 × 10$^5$ | D638 | 3.22 × 10$^5$ | 3.60 × 10$^5$ | |
| DTUL at 264 psi (annealed) | D648 | 158.0° F. | 174.2° F. | est. 208° F. |
| Light Transmission (%) | D570 | 91.7 | 88.9 | 90.3 |

These tests show the blend has a significant improvement in melt flow and notched Izod Impact over the components per se without an undue reduction in other properties.

EXAMPLE II

An 85:15 weight ratio of the graft terpolymer of example I and graft copolymer of example I was prepared. The melt flow (Cond I g/10 min. ASTM D1238) of the polymer blend was 3.30. The notched Izod impact of a molded test bar of the sample (ASTM D265A) was 2.50 ft lbs/in. These results show an improvement in the notched Izod impact over the original polymers.

I claim:
1. A polymer blend comprising:
   (A) from 10 to 40 parts by weight of a graft copolymer formed by the free radical polymerization of a monomer mixture comprising:
      (i) from 45 to 70 weight percent of one or more $C_{1-2}$ alkyl acrylates, methacrylates, or a mixture thereof;
      (ii) from 25 to 50 weight percent of one or more $C_{8-12}$ vinyl aromatic monomers which are unsubstituted or substituted by a $C_{1-4}$ alkyl radical or a chlorine atom;
   in the presence of

(iii) from 5 to 30 weight percent of a polymer of one or more $C_{4-6}$ conjugated diolefins, said polymer having a molecular weight of from 20,000 to 150,00; and (iv) either (a) from 0.05 to 0.15 weight percent of a chain transfer agent if initiator is present in an amount of less than 1.0 parts by weight per 100 parts of monomer and conjugated diolefin; or (b) the absence of a chain transfer agent if initiator is present in an amount of at least 1.0 parts by weight per 100 parts of monomer; and (B) from 90 to 60 parts by weight of a graft terpolymer formed by the polymerization of a mixture comprising:

(i) from 25 to 75 weight percent of one or more $C_{8-12}$, vinyl aromatic monomers which are unsubstituted or substituted by a $C_{1-4}$ alkyl radical or a chlorine atom;

(ii) from 10 to 50 weight percent of one or more methacrylate esters which form homopolymers having a Tg greater than 40° C., (iii) from 7 to 30 weight percent of one or more acrylate esters which form homopolymers having a Tg less than 35° C.; in the presence of:

(iv) from 2 to 20 weight percent of a di- or tri-block copolymer of the formula C-D or C-D-C wherein C is a homopolymer block of a $C_{8-12}$ vinyl aromatic monomer which is unsubstituted or substituted by a $C_{1-4}$ alkyl radical or a chlorine atom; and D is a homopolymer block of a $C_{4-6}$ conjugated diolefin which is unsubstituted or substituted by a chlorine atom; said block copolymer having a molecular weight of at least 75,000.

2. A polymer blend according to claim 1 wherein in component (A) the ratio of $C_{1-2}$ alkyl acrylate, methacrylate monomers, or a mixture thereof, to vinyl aromatic monomer is controlled so that the refractive index of component (A) is within ±0.01 of the refractive index of component (B).

3. A polymer blend according to claim 2 wherein in component (A) said $C_{1-12}$ alkyl acrylate, methacrylate monomers, or a mixture thereof is present in an amount from 50 to 55 weight percent and is methyl methacrylate.

4. A polymer blend according to claim 3 wherein in component (A) said vinyl aromatic monomer is selected from the group consisting of styrene, alpha methyl styrene and a mixture thereof, and is present in and amount from 35 to 40 weight percent.

5. A polymer blend according to claim 4 wherein in component (A) said polymer of a $C_{4-6}$ conjugated diolefins has a molecular weight from 30,000 to 50,000.

6. A polymer blend according to claim 5 wherein in component (A) said polymer of a $C_{4-6}$ conjugated diolefin is present in an amount from 5 to 10 weight percent and is polyisoprene.

7. A polyblend according to claim 6 wherein in component (B) said vinyl aromatic monomer is present in an amount from 35 to 45 weight percent and is selected from the group consisting of styrene, alpha methyl styrene, t-butyl styrene and a mixture thereof.

8. A polyblend according to claim 7 wherein in component (B) said methacrylate ester which forms homopolymers having a Tg greater than 40° C. is present in an amount from 35 to 45 weight percent.

9. A polyblend according to claim 8 wherein in component (B) said acrylate ester which forms a homopolymer having a Tg less than 35° C. is present in an amount from 7 to 15 weight percent.

10. A polyblend according to claim 9 wherein in component B said block copolymer has a molecular weight from 175,000 to 275,000.

11. A polyblend according to claim 10 wherein component (A) is prepared in the presence of about 0.2 weight percent of a chain transfer agent which is a $C_{8-15}$ alkyl mercaptan.

12. A polyblend according to claim 10 wherein component A is polymerized in the presence of a mixture comprising 0.2 to 1 parts of an aromatic peroxide and 0.2 to 1 parts by weight of a peroxide of a $C_{8-15}$ alkyl carboxylic acid.

* * * * *